Aug. 28, 1951 W. J. D. VAN DIJCK 2,566,098
MAGNETIC COMPASS
Filed Dec. 31, 1948
FIG. 1.
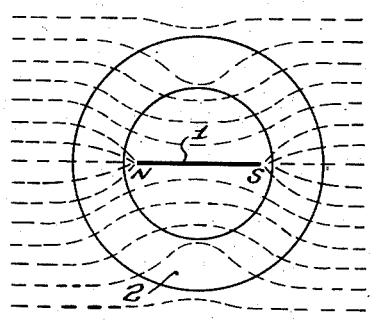
FIG. 2.
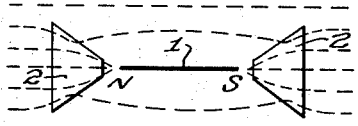
FIG. 3.
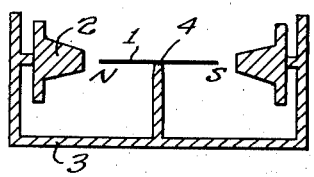
FIG. 4.
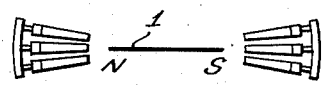
FIG. 5.
FIG. 6.
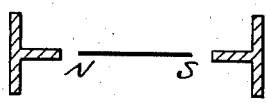
FIG. 7.
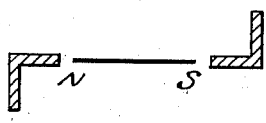
FIG. 8.
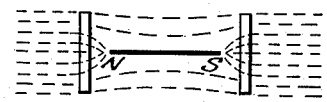
FIG. 9.
FIG. 10.
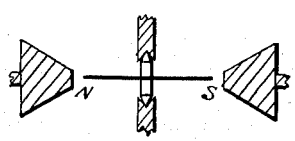
INVENTOR.
Willem J. D. Van Dijck
BY
Michael Ebert
AGENT Patented Aug. 28, 1951

2,566,098

UNITED STATES PATENT OFFICE 2,566,098

MAGNETIC COMPASS

Willem Johannes Dominicus van Dijck, The Hague, Netherlands, assignor of one-half to Nederlandse Centrale Organisatie Voor Toegepast-Natuurwetenschappelijk Onderzoek, The Hague, Netherlands, a corporation of the Netherlands Application December 31, 1948, Serial No. 68,597
In the Netherlands February 2, 1948

16 Claims. (Cl. 33—222)

The present invention relates to magnetic compasses and its object is to provide a compass, particularly for application in aircraft and vehicles, in which a number of the objections inherent in the usual compasses are absent. Also to provide a compass, which when used on warships and in tanks, where the compass must function in armoured domes in a weakened earth's field, is very well usable. Though, therefore, the primary object was the provision of compasses for the indication of the magnetic north pole, the invention may be applied in any instrument indicating the direction of an almost homogeneous magnetic field, or the component of the direction in a certain plane, by means of a magnetic needle, so that the term compass as used in the application should be taken to include any such instrument.

Almost all objections encountered in magnetic compasses for the determination of the magnetic north pole, particularly in the application thereof to aircraft, which objections will be explained below in greater detail, are connected with the fact that the magnetic field of the earth has only a relatively low intensity and that, moreover, said field is not directed horizontally, but forms an angle, the inclination, with the horizontal plane. The weakness of the earth's magnetic field makes the use of strong magnetic needles desirable, which, however, must not have too high a weight in order to restrict the frictional force as much as possible. For the sake of restricting the friction the needle is suspended in one point only; however, in order to maintain the needle in the horizontal position, the centre of gravity thereof must be under said point of support, or alternatively, in order to prevent its inclination as a result of the vertical component of the earth's magnetic field, not only under the horizontal plane of the point of support, but a little to one side of the perpendicular through said point of support. Owing to the non-coincidence of the point of support and the centre of gravity, accelerations to which the compass is subjected, produce undesirable movements of the needle, which causes the compass to give erroneous indications.

According to the invention, the earth's magnetic field at the place of the magnetic needle in the plane in which said needle moves, is strengthened by the concentration of the lines of force in the earth's magnetic force, in the first place. Thereto the compass is surrounded by a ring of a magnetic permeability which is higher in the radial direction and in the axial direction than in the tangential direction, the axis of symmetry of which ring coincides with the axis of rotation of the compass needle and the dimension of which in the axial direction decreases from the outside towards the inside.

The invention will be further explained with reference to the accompanying drawing in which:

Figs. 1 and 2 are a diagrammatic plan view and side elevation, respectively, of a device according to the invention;

Figs. 3 and 4 are a sectional elevation and plane view, respectively, of a practical embodiment of the present invention;

Fig. 5 illustrates some alternative modifications of lamellae shown in Figures 3 and 4; and Figs. 6 to 9 show further embodiments, respectively, of the present invention.

Fig. 10 shows diagrammatically in a sectional side elevation another embodiment of the present invention.

Figures 1 and 2 serve for illustrating the principle. The needle 1 of the compass is surrounded by a ring 2, the axis of symmetry of which coincides with the vertical axis of rotation of the magnet and which, furthermore, is symmetrically shaped with respect to the horizontal plane, in which the compass needle moves. The cross-profile of the ring, outlined in Fig. 2, shows approximately the shape of a triangle, an angular point of which is directed towards the axis of symmetry of the ring and lies in the plane of the needle. Outside the ring a number of lines of magnetic force of a homogeneous field are shown, moreover, which lines are supposed to be horizontal.

According to the invention the ring 2 must now have the property, that the permeability in the radial direction and in the axial direction is considerably higher than that in the circumferential direction and also higher than that of the surrounding medium, while the absolute value of the permeability in the tangential or circumferential direction must not be too high.

In that case the lines of magnetic force will run approximately as indicated in the drawing, i. e. in the ring they will as far as possible adopt a radial direction. In the radial cross-profile they will be directed from the exterior side of the triangle towards the interior points thereof.

It will be apparent that at the place of the compass needle there is thus formed a magnetic field of considerably higher intensity than the field which would exist there without the ring, that the field is concentrated in that place. The directing force acting upon the compass needle therefore is correspondingly increased thereby. Rotation of the ring about the vertical axis of symmetry has no influence whatever upon the position of the needle. The rotatorily symmetrical shape of the ring effects a concentration of the lines of magnetic force in the horizontal sense, the special cross-profile of the ring effects a concentration in the vertical sense.

If a vertical field has been superposed upon the horizontal field exclusively shown in the drawing, the former will not be concentrated by the ring in the space surrounded thereby; on the contrary, the lines of magnetic force of said vertical field will preferably find their way through the ring itself due to its high permeability in the direction of said field. If the ring is placed in any given position in a field of magnetic force the direction of said field may be resolved into two components, one of which is in the plane of the ring, the other normal thereto; only the magnetic force in the former direction is then strengthened by the ring, the other, however, is weakened. Thus, therefore, the influence of the vertical component of the earth's magnetic field upon the compass needle is rigorously reduced when the ring is maintained in a horizontal position.

In order to realise the anisotropy of the ring with respect to the magnetic permeability said ring may be built up out of elements directed radially and having a high permeability, for example, manufactured from some special iron, said elements being each time separated one from another by interspaces of slight permeability, consisting, for example of copper, ceramic material or so-called plastic. In other words the magnetic resistance is made as low as possible in radial and axial directions, as high as possible in the circumferential direction. To this end the ring may be built up out of lamellae placed radially and having the shape as shown in Figures 3 and 4. These lamellae may be wedge-shaped, as shown in Figure 4 in plan view, the small side being directed towards the middle, though this is not necessary. They will also catch substantially all of the lines of force, if they consist of flat plates; it is only desirable, in that case, to take care, that the plates by the interposition of a material of low permeability are joined to form a ring in such a way, that the centre lines of the plates keep a purely radial direction. The compass needle 1 and the ring 2 are supported by means 3 diagrammatically indicated in Figure 3 so that the center of the ring 2 substantially coincides with the center 4 of the compass needle 1 and the axis of the ring 2 substantially coincides with the axis of rotation of the compass needle 1.

In order to increase the magnetic resistance in the circumferential direction as much as possible, adjacent lamellae will preferably be given a shape such, that they overlap as little as possible. To this end lamellae as shown in Figure 3 may be alternated by lamellae as shown in Figure 5. It is also possible to alternately use the lamellae indicated by $a$ and $b$ in Figure 5.

Instead of triangular lamellae, however, lamellae according to Figure 6 or 7 may also be used. In the latter case the lamellae may be alternately placed upwards and downwards, as shown in Figure 8. The outer side of the lamellae may also be placed tangentially instead of radially then. Using only the axial lamellae according to Figure 9 axial concentration of the field at the place of the magnetic needle is also obtained.

Furthermore care should be taken that the thickness of the lamellae at the inside of the ring is not greater than the length of the arc corresponding to the desired accuracy of the indication. At that point the thickness of the ring in axial direction and the distance to the poles of the magnetic needle should also be such, that the material of the ring is not magnetized too strongly by the magnetic action of these poles, which would result in the needle staying in the position once occupied. In the case of too small a distance to the magnetic needle, moreover, the centering would require too much accuracy.

A two-point type of support for the needle has advantages over a single-point pivot, but has been considered to entail too much friction.

The local intensification of the earth's magnetic field obtained by the above means and the resulting increase in the directing force acting upon the compass needle, which force tries to bring it into the magnetic meridian, render it possible now to choose this type of support which permits rotation only about the axis determined by these points, and to arrange the centre of gravity of the needle in this axis (Fig. 10). Accelerations, to which the compass is subjected, can then exert no influence upon the position or the movement of the needle, which is especially advantageous where violent accelerations often occur, such as in aircraft and vehicles.

But also if the support of the needle in one point is maintained, the application of the invention enables the centre of gravity of the needle to be arranged in, or at least very near the point of support. As has already been said, the influence of the vertical component of the earth's magnetic field is rigorously reduced by the ring and on account of the magnetic field having the highest intensity in the horizontal plane of symmetry of the ring, the needle will be maintained in this plane even without the assistance of gravity.

The fact that gravity and acceleration forces exert no influence upon the needle, permits, furthermore, the placing of the compass in aircraft in a position which is particularly advantageous in flying curves in a horizontal plane. In order to make this clear we shall first consider the case of a compass needle normally maintained in the horizontal position by gravity. In flying a curve the aeroplane and similarly the plane of the compass needle is tilted. If one flies now in a direction not purely normal to the north-south-direction, the vertical component of the earth's magnetic field will have a component in the plane of the compass needle, which will pull this needle, to the one or to the other side, out of its correct position. It would be desirable, therefore, to keep the compass horizontal in such a curve, but, as said, this is not feasible, because the resultant of gravity and centrifugal force acting upon the needle will tilt the plane of movement of the needle. The application of the invention permitting the elimination of the influence of mass forces upon the position of the needle, also renders it possible now to maintain the compass in the horizontal position, in these cases too. For this purpose the casing of the compass is made adjustable with respect to the aeroplane, so that, in the case outlined above, it may be returned to the horizontal position, either manually or automatically by means of a turn indicator of any known type (for example, acting gyroscopically, or by the differential pressure on the wings), to which the casing is coupled.

I claim:

1. A magnetic compass comprising in combination, a magnet system arranged for rotation about an axis; a ring; means for supporting said magnet system and said ring with the center thereof substantially coinciding with the center of rotation of said magnet system and the axis of said ring substantially coinciding with the axis of rotation of said magnet system; lamellae forming part of said ring and consisting of a material having a relatively high magnetic permeability; and lamellae forming part of said ring and consisting of a material having a relatively low magnetic permeability, said lamellae having a relatively high magnetic permeability alternating circumferentially with said lamellae having a relatively low magnetic permeability, whereby said ring has a relatively high magnetic permeability in the radial and axial directions thereof and a relatively low magnetic permeability in the tangential directions thereof.

2. A magnetic compass comprising in combination, a magnet system arranged for rotation in a plane about an axis; a ring having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system; lamellae forming part of said ring and consisting of a material having a relatively high magnetic permeability; and lamellae forming part of said ring and consisting of a material having a relatively low magnetic permeability, said lamellae having relatively high magnetic permeability alternating circumferentially with said lamellae having a relatively low magnetic permeability, whereby said ring has a relatively high magnetic permeability in the radial and axial directions thereof and a relatively low magnetic permeability in the tangential directions thereof.

3. A magnetic compass comprising in combination, a magnet system arranged for rotation in a plane about an axis; a ring having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system; said inner face of said ring having the minimal diameter thereof in a plane coinciding with the plane of rotation of said magnet system; lamellae forming part of said ring and consisting of a material having a relatively high magnetic permeability; and lamellae forming part of said ring and consisting of a material having a relatively low magnetic permeability, said lamellae having a relatively high magnetic permeability alternating circumferentially with said lamellae having a relatively low magnetic permeability, whereby said ring has a relatively high magnetic permeability in the radial and axial directions thereof and a relatively low magnetic permeability in the tangential directions thereof.

4. A magnetic compass comprising in combination, a magnet system arranged for rotation in a plane about an axis; a ring having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system; substantially trapezoidal lamellae forming part of said ring and consisting of a material having a relatively high magnetic permeability; and substantially trapezoidal lamellae forming part of said ring and consistign of a material having a relatively low magnetic permeability, said lamellae having a relatively high magnetic permeability alternating circumferentially with said lamellae having a relatively low magnetic permeability, whereby said ring has a relatively high magnetic permeability in the radial and axial directions thereof and a relatively low magnetic permeability in the tangential directions thereof.

5. A magnetic compass comprising in combination, a magnet system arranged for rotation in a plane about an axis; a ring having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system; lamellae forming part of said ring and consisting of a material having a relatively high magnetic permeability; and lamellae forming part of said ring and consisting of a material having a relatively low magnetic permeability, said lamellae having substantially the shape of a recumbent T, said lamellae having a high magnetic permeability alternating circumferentially with said lamellae having a relatively low magnetic permeability, whereby said ring has a relatively high magnetic permeability in the radial and axial directions thereof and a relatively low magnetic permeability in the tangential directions thereof.

6. A magnetic compass comprising in combination, a magnet system arranged for rotation in a plane about an axis; a ring having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system, said inner face of said ring having the minimal diameter thereof in a plane coinciding with the plane of rotation of said magnet system; lamellae forming part of said ring and consisting of a material having a relatively high magnetic permeability; and lamellae forming part of said ring and consisting of a material having a relatively low magnetic permeability, said lamellae having substantially the shape of a triangle, said lamellae having a relatively low magnetic permeability alternating circumferentially with said lamellae having a relatively low magnetic permeability, whereby said ring has a relatively high magnetic permeability in the radial and axial directions thereof and a relatively low magnetic permeability in the tangential directions thereof.

7. A magnetic compass comprising in combination, a magnet system arranged for rotation in a plane about an axis; a ring having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system; lamellae forming part of said ring and consisting of a material having a relatively high magnetic permeability; and lamellae forming part of said ring and consisting of a material having a relatively low magnetic permeability, said lamellae having a relatively high magnetic permeability alternating circumferentially with said lamellae having a relatively low magnetic permeability, adjacent ones of said lamellae overlapping one another only in part, whereby said ring has a relatively high magnetic permeability in the radial and axial directions thereof and a relatively low magnetic permeability in the tangential directions thereof.

8. A magnetic compass comprising in combination, a magnet system arranged for rotation in a plane about an axis; a ring having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system; lamellae forming part of said ring and consisting of a material having a relatively high magnetic permeability; and lamellae forming part of said ring and consisting of a material having a relatively low magnetic permeability, said lamellae having a relatively high magnetic permeability alternating circumferentially with said lamellae having a relatively low magnetic permeability, adjacent ones of said lamellae having different shapes overlapping one another only in part, whereby said ring has a relatively high magnetic permeability in the radial and axial directions thereof and a relatively low magnetic permeability in the tangential directions thereof.

9. A magnetic compass comprising in combination, a magnet system arranged for rotation in a plane about an axis; a ring having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system; lamellae forming part of said ring and consisting of a material having a relatively high magnetic permeability; and lamellae forming part of said ring and consisting of a material having a relatively low magnetic permeability, said lamellae having a relatively high magnetic permeability alternating circumferentially with said lamella having a relatively low magnetic permeability, adjacent ones of said lamellae being differently oriented so as to overlap one another only in part, whereby said ring has a relatively high magnetic permeability in the radial and axial directions thereof and a relatively low magnetic permeability in the tangential directions thereof.

10. A magnetic compass comprising in combination, a magnet system arranged for rotation in a plane about an axis; a ring symmetrical with respect to the plane of rotation of said magnet system and having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system; lamellae forming part of said ring and consisting of a material having a relatively high magnetic permeability; and lamellae forming part of said ring and consisting of a material having a relatively low magnetic permeability, said lamellae having a relatively high magnetic permeabilty alternating circumferentially with said lamellae having a relatively low magnetic permeability, whereby said ring has a relatively high magnetic permeability in the radial and axial directions thereof and a relatively low magnetic permeability in the tangential directions thereof.

11. A magnetic compass comprising in combination, a magnet system arranged for rotation in a plane about an axis; a ring symmetrical with respect to the plane of rotation of said magnet system and having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system, said inner face of said ring having the minimal diameter thereof in a plane coinciding with the plane of rotation of said magnet system; lamellae forming part of said ring and consisting of a material having a relatively high magnetic permeability; and lamellae forming part of said ring and consisting of a material having a relatively low magnetic permeability, said lamellae having a relatively high magnetic permeability alternating circumferentially with said lamellae having a relatively low magnetic permeability, whereby said ring has a relatively high magnetic permeability in the radial and axial directions thereof and a relatively low magnetic permeability in the tangential directions thereof.

12. A magnetic compass comprising in combination, a magnet system arranged for rotation in a plane about an axis; a ring symmetrical with respect to the plane of rotation of said magnet system and having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system; substantially trapezoidal lamellae forming part of said ring and consisting of a material having a relatively high magnetic permeability; and substantially trapezoidal lamellae forming part of said ring and consisting of a material having a relatively low magnetic permeability, said lamellae having a relatively high magnetic permeability alternating circumferentially with said lamellae having a relatively low magnetic permeability, whereby said ring has a relatively high magnetic permeability in the radial and axial directions thereof and a relatively low magnetic permeability in the tangential directions thereof.

13. A magnetic compass comprising in combination, a magnet system arranged for rotation in a plane about an axis; a ring symmetrical with respect to the plane of rotation of said magnet system and having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system; lamellae forming part of said ring and consisting of a material having a relatively high magnetic permeability; and lamellae forming part of said ring and consisting of a material having a relatively low magnetic permeability, said lamellae having substantially the shape of a recumbent T, said lamellae having a relatively high magnetic permeability alternating circumferentially with said lamellae having a relatively low magnetic permeability, whereby said ring has a relatively high magnetic permeability in the radial and axial directions thereof and a relatively low magnetic permeability in the tangential directions thereof.

14. A magnetic compass comprising in combination, a magnet system arranged for rotation in a plane about an axis; a ring symmetrical with respect to the plane of rotation of said magnet system and having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially conciding with the axis of rotation of said magnet system; lamellae forming part of said ring and consisting of a material having a relatively high magnetic permeability; and lamellae forming part of said ring and consisting of a material having a relatively low magnetic permeability, said lamellae having substantially the shape of a triangle, said lamellae having a relatively high magnetic permeability alternating circumferentially with said lamellae having a relatively low magnetic permeability, whereby said ring has a relatively high magnetic permeability in the radial and axial directions thereof and a relatively low magnetic permeability in the tangential directions thereof.

15. A magnetic compass comprising in combination, a magnet system arranged for rotation in a plane about an axis; a ring symmetrical with respect to the plane of rotation of said magnet system and having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system; lamellae forming part of said ring and consisting of a material having a relatively high magnetic permeability; and lamellae forming part of said ring and consisting of a material having a relatively low magnetic permeability, said lamellae having a relatively high magnetic permeability alternating circumferentially with said lamellae having a relatively low magnetic permeability, adjacent ones of said lamellae overlapping one another only in part, whereby said ring has a relatively high magnetic permeability in the radial and axial directions thereof and a relatively low magnetic permeability in the tangential directions thereof.

16. A magnetic compass comprising in combination, a magnet system arranged for rotation in a plane about an axis; a ring symmetrical with respect to the plane of rotation of said magnet system and having an outer face and having an opposite inner face facing said magnet system, said inner face having an appreciably smaller width than said outer face; means for supporting said magnet system and said ring with the plane of rotation of said magnet system intersecting substantially the midportion of said faces of said ring and the axis of said ring substantially coinciding with the axis of rotation of said magnet system; lamellae forming part of said ring and consisting of a material having a relatively high magnetic permeability; and lamellae forming part of said ring and consisting of a material having a relatively low magnetic permeability, said lamellae having a relatively high magnetic permeability alternating circumferentially with said lamellae having a relatively low magnetic permeability, adjacent ones of said lamellae having different shapes overlapping one another only in part, whereby said ring has a relatively high magnetic permeability in the radial and axial directions thereof and a relatively low magnetic permeability in the tangential directions thereof.

WILLEM JOHANNES DOMINICUS
VAN DIJCK.

REFERENCES CITED

The following references are of record in the file of this patent:

FOREIGN PATENTS

| Number | Country | Date |
| --- | --- | --- |
| 676 | Great Britain | Mar. 9, 1867 |